Feb. 13, 1968  R. R. SWAIN  3,368,804

BLAST FURNACE INJECTION FUEL CONTROL

Filed Aug. 17, 1965  2 Sheets-Sheet 1

INVENTOR.
RALPH R. SWAIN
BY
*John F. Luhrs*
ATTORNEY

INVENTOR.
RALPH R. SWAIN
BY John F. Luhrs
ATTORNEY

United States Patent Office 3,368,804
Patented Feb. 13, 1968

3,368,804
BLAST FURNACE INJECTION FUEL CONTROL
Ralph R. Swain, South Euclid, Ohio, assignor to Bailey Meter Company, a corporation of Delaware
Filed Aug. 17, 1965, Ser. No. 480,311
5 Claims. (Cl. 266—30)

ABSTRACT OF THE DISCLOSURE

An apparatus for controlling the flow of coal slurry from a manifold through individual tuyeres into a blast furnace; said apparatus including a simple aspirator valve positioned in each of the tuyeres. The flow of aspirator fluid through the aspirator valve is regulated by a control signal which is a function of coal slurry flow into the tuyere, so as to maintain a constant rate of flow of coal slurry into the furnace.

---

This invention relates to a system for controlling the flow of a coal slurry to a furnace. More particularly this invention relates to a system for controlling the flow of a coal slurry injection fuel to a blast furnace.

The conventional blast furnace comprises an elongated section known as a stack, a hearth and a section known as a bosh located between the hearth and the stack. A blast gas, usually compressed air, is blown through tuyeres into the upper portion of the hearth, and the burden, including limestone, ferrous bearing material and a carbonaceous material such as coke is intermittently charged into the furnace at the top of the stack. The burden moves down the stack. In the zone adjacent the tuyeres, the coke or other carbonaceous material burns and the heat of combustion smelts the ore to produce molten pig iron. The products of combustion, as they pass upwardly through the stack, being at relatively high temperature serves to preheat the burden and reduce the iron ore.

Recently a supplementary fuel, known as "injection fuel," has been introduced into the furnace through the tuyeres. Injection fuels include gas, such as natural gas or coke oven gas, fuel oil and coal. Briefly, fuel injection is the process of mixing fuel with the blast gas and burning the mixture in the hearth section of the furnace. Several benefits are immediately obvious as a result of fuel injection. By using fuel injection it has been found that iron output is increased and the required amounts of coke or other carbonaceous materials decreased.

While working with the concept of fuel injection it was found that a limit exists as to the amount of gas that can be used. To use natural gas, which is low in carbon, the temperature of the blast must be raised, there is a limit as to how high it can be raised. Further, it was discovered that as the amount of gas is increased there is a diminishing amount of coke or other carbonaceous material that can be saved. Fuel oil, which is closer to coke in carbon content, does not require the hot blast but here the cost is nearly that of coke. Coal now appears to be the most acceptable fuel for injection, the problem existing with the use of coal is the lack of controllability or the expense required to control.

Coal slurry overcomes most of the problems encountered with the use of coal as an injection fuel, however, there is not a satisfactory method available for controlling the rate of flow of coal slurry. One method which has been used is a pinch valve. This is not satisfactory since the range of control is limited to only 2 to 1 and the valve is susceptible to plugging.

What I define as coal slurry is a mixture of a liquid and ground coal. The liquid acts as a carrier to allow free flow of coal through the pipes and into the furnace. Different liquids can be used as this carrier, two examples are oil and water. Depending on what carrier is used determines the percentage of coal to liquid carrier. Maximum percentages are; 70% coal and 30% water when water is the carrier, and 60% coal and 40% oil when oil is the carrier. These ratios are based on the size of the coal particles in the slurry. During my work on this idea I used coal about one-eighth inch. Neither the size of the coal, the ratio of coal to carrier or the liquid used can be construed as improvements on this invention since variations are possible without changing the concept.

It is the object of this invention to provide a coal slurry control valve that is not susceptible to plugging.

It is further the object of this invention to provide a method of controlling the rate of flow of coal slurry for improved furnace operation.

I consider coal slurry the best injection fuel available today, however, I have found that control of coal slurry, using any of the available techniques, is a difficult and costly operation. By using my invention the rate of flow of coal slurry can be controlled efficiently and inexpensively.

Other methods of controlling coal slurry require complex systems, such as individual burner pumps. My system requires a simple aspirator type valve which has no moving parts. It is readily apparent that with no moving parts my control valve will operate comparatively maintenance free. Other methods require the use of valves, such as the previously mentioned pinch valve, which has a tendency to plug.

Figure 1:
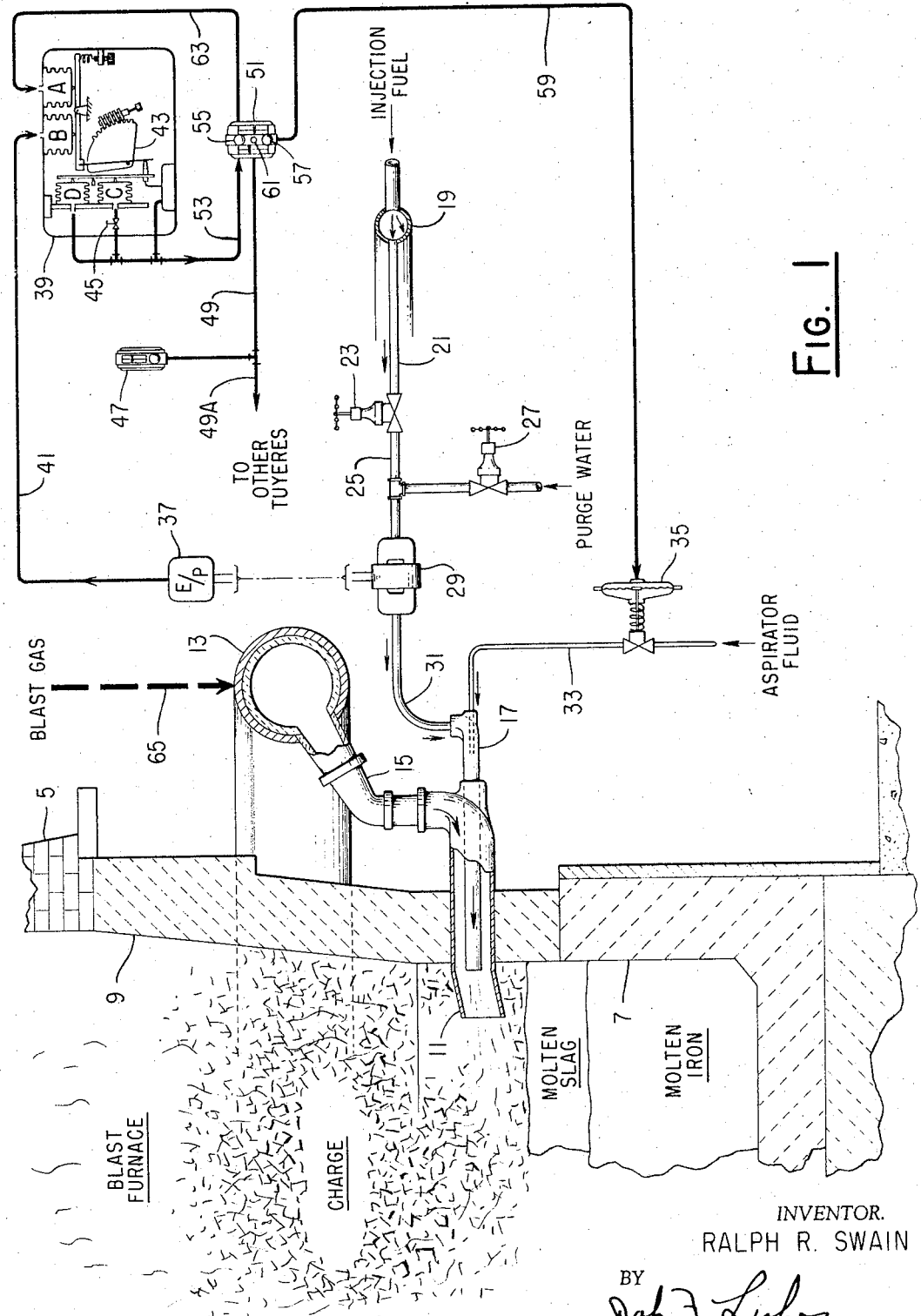
FIG. 1 is a schematic illustration of my coal slurry control system applied to one tuyere of a blast furnace.

With reference to FIG. 1, there is shown a portion of a blast furnace including, a stack 5, hearth 7, and bosh 9 located between the hearth and the stack. Located at the upper portion of the hearth 7 are tuyeres 11. Only one tuyere is shown, the remaining tuyeres would be distributed around the furnace in similar relative positions, it being understood that in a blast furnace a plurality of tuyeres is required. A bustle pipe 13 encircles the lower portion of the furnace and supplies a blast gas, such as air, to the tuyere 11 through connecting pipe 15.

Coal slurry is introduced into the furnace by means of an aspirator 17 mounted through the tuyere 11. A circle pipe 19 encircles the furnace carrying the coal slurry and acting as a header for the plurality of tuyeres in a typical blast furnace. The coal slurry is transmitted from circle pipe 19 to the aspirator 17 through a pipe 21, a shutoff valve 23, here shown hand operated although an automatic operator could be employed, pipe 25, connecting shut-off valve 23 to a magnetic flow transmitter 29, and a pipe 31. A purge valve 27 is connected into pipe 25, the need for this valve will be explained more fully hereafter.

The aspirator fluid, used to control the coal slurry, as hereinafter more fully explained, is transmitted to the aspirator 17 through pipe 33 and controlled by a valve 35. I have chosen to describe the control using air as an aspirator fluid. This is not meant to limit my invention, as other gases may be employed or even a vapor, such as steam.

Turning now to a consideration of the flow control of the coal slurry, I have illustrated a system of the pneumatically operated type for the reason that the components of such type are well known and understood in the art. However, I could equally as well use an electrically or hydraulically operated control system as will be readily appreciated as the description proceeds.

In accordance with my invention, the rate of flow of injection fuel is regulated by a master control signal. I show a hand loader 47 for generating the required signal, but this signal could also come from another section of the control system. For example, a master signal as described in my copending patent application Ser. No. 114,090, filed June 1, 1961, now Patent 3,220,825, entitled, "Control for Blast Furnaces" could be derived from the combustibles content in the top gas leaving the blast furnace. The master signal is transmitted from hand loader 47 via pipe 49 to a bias selector station 51. By means of bias selector station 51 the master control signal may be biased to vary the rate of flow of coal slurry to a tuyere relative to the rates of flow to the other tuyeres.

Flow transmitter 29 measures the rate of flow of coal slurry to an individual tuyere; here I chose to use a magnetic type flow transmitter, similar to the type illustrated and described in U.S. Patent 2,867,119, issued to S. S. Sturgeon, although it is easily understood that other transmitters could be employed without changing the concept of my invention. An electric to pneumatic converter, diagrammatically shown at 37, generates a loading pressure proportional to the electrical output of flow transmitter 29. The loading pressure from converter 37 is accordingly proportional to the rate of flow of the coal slurry.

This control signal is transmitted to bellows B of a relay 39 through pipe 41. This relay may, for example, be of a type illustrated and described in United States Patent 2,805,678 issued to Michael Panich on Sept. 10, 1951, and establishes in output bellows D a control pressure varying both in accordance with changes in the loading pressure in pipe 41 and the time integral of the deviation of this pressure from a predetermined value corresponding to the desired rate of flow of coal slurry in pipe 31. Such a relay is spoken of in the art as having proportional plus reset action. Both the proportional and reset actions may be adjusted in accordance with the time constants of the system by means of sector 43 and bleed valve 45 respectively. The output signal of relay 39 from bellows D is transmitted to bias selector station 51 through pipe 53 and then through pipe 59 to valve 35.

Recapitulating, bias selector station 51 receives the master signal from the hand loader 47. This signal is biased for desired equal or proportional tuyere operation and this bias signal or biased master signal as it may be called, is then transmitted through a pipe 63 to the A bellows of relay 39. The loading pressure from converter 37, effective in the B bellows of relay 39, is balanced against this pressure.

Selector station 51 may be of the type illustrated and described in the Panich Patent 2,805,678 and affords a means for transferring the control from automatic to remote manual by means of a switch 55. Knob 57 provides a means by which the control pressure in pipe 59 may be manually adjusted with the station in manual position. With the station in automatic position, the rate of flow of slurry to tuyere 11 is biased relative to the rate of flow of the other tuyeres, as previously explained, by knob 61.

The signal from bias selector station 51 is transmitted to the actuator of valve 35 via pipe 59. The amount of aspirator fluid for control of coal slurry is, therefore, controlled by the master signal which in effect establishes the set point of the constant flow control comprising meter 29, relay 39, and valve 35.

Improvement in the operation of the aspirator 17 and the control system therefore will result if the pressure of the slurry in circle pipe 19 is maintained slightly higher than the pressure of the blast gas in bustle pipe 13. I show a system for maintaining a continuous supply of coal slurry at a pressure higher than the blast gas in FIG. 2. As shown, the blast gas is introduced into the bustle pipe 13 through pipe 65, usually at a pressure around 25 p.s.i.

Coal slurry is supplied the aspirator 17 from circle pipe 19 through pipes 31 as described with reference to FIG. 1. The coal slurry is continuously circulated from a sump 67 through circle pipe 19 by means of sump pump 69, the speed of which controls the circle pipe pressure.

Turning now to a consideration of control for maintaining a circle pipe pressure slightly in excess of the bustle pipe pressure I again illustrate a pneumatically operated type. As I explained previously, I could equally as well use an electrically or hydraulically operated control system.

Figure 2:
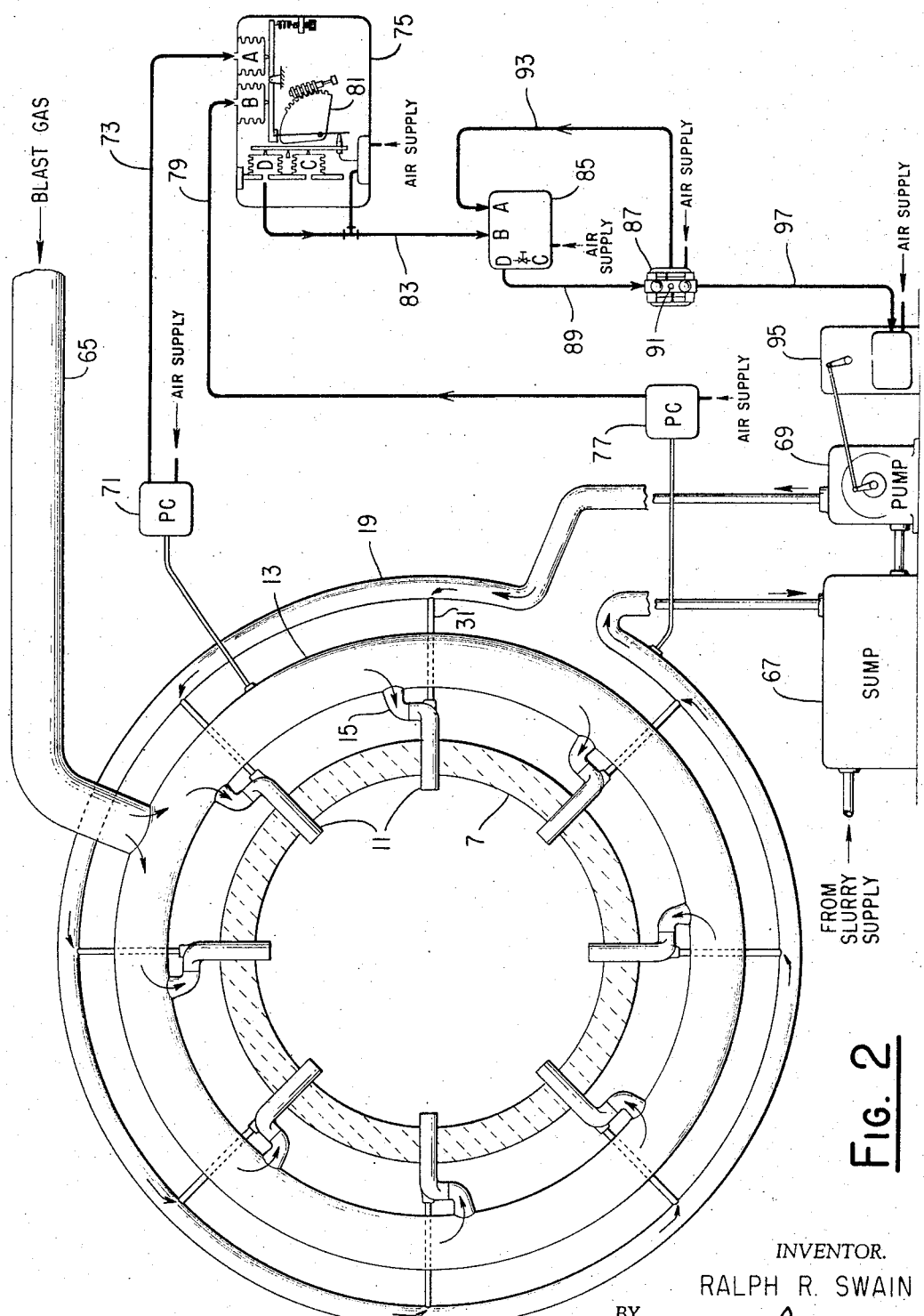
FIG. 2 shows a control for maintaining proper header pressure at the tuyeres.

FIG. 2 shows a pressure transmitter 71 for measuring the blast gas pressure in bustle pipe 13. The loading pressure generated by controller 71 is transmitted through a pipe 73 to bellows A of relay 75, similar to relay 39 in FIG. 1. I also show a pressure transmitter 77 for establishing a loading pressure proportional to the circle pipe pressure. This loading pressure is transmitted to bellows B of relay 75 through pipe 79.

Changes in control pressure established in bellows D of relay 75 are inversely proportional to changes in pressure in bellows B and directly proportional to changes in pressure in bellows A. Therefore, for a decrease in pressure in bellows B or an increase in pressure in bellows A the pressure in bellows D will increase, and vice versa. It should then be obvious that the pressure in bellows D will be proportional to the difference in pressure between bellows A and B. An adjustment 81 is provided for adjusting the ratio between the $A-B$ differential and resulting changes at D. This is spoken of in the art as a "proportional band" adjustment.

The control pressure established in bellows D of relay 75 is transmitted through pipe 83 to bellows B of a relay 85, which is identical to relay 39 of FIG. 1. The pressure in bellows B of relay 85 is compared to a set point pressure in bellows A. The set point pressure establishes the differential pressure between the blast gas and the coal slurry. Any change in pressure in either the circle pipe 19 or the bustle pipe 13 varies the differential between the set point pressure in bellows A and the pressure in bellows B of relay 85, this differential determines the output pressure generated in bellows D. A selector station 87 receives the output pressure of relay 85 via a pipe 89. This selector station is similar to the bias selector station 51 of FIG. 1 except it is provided with a relay (not shown) adjustable by a knob 91 for varying the set point loading pressure transmitted to relay 85. The control pressure from relay 85 is transmitted through selector station 87 to pump controller 95 through a pipe 97. Pump controller 95 may vary the stroke or speed of pump 69 to adjust the pressure in circle pipe 19 as required to maintain it at a predetermined amount higher than the pressure in bustle pipe 13.

Although my system is not susceptible to plugging during operation, some precautions are required when starting and stopping the slurry flow. Referring to FIG. 1, valve 27 is included for flushing the aspirator with a fluid, such as oil or water, during these periods. When the coal slurry flow is stopped by closed shut-off valve 23, purge valve 27 is opened allowing the flushing fluid to flush all the residue coal slurry from the aspirator. After the flushing is complete the purge valve is closed.

Before the shut-off valve is opened, when flow is to be resumed, the pipe is again purged. This purging coats pipes 25 and 31, preventing the coal slurry from adhering to the pipe and plugging during start up.

Aspirators of the type discussed herein require a high pressure fluid to effectuate control. In the description of this invention, air was used as this high pressure fluid, this is not meant as a limitation as will be seen presently. Other fluids that could be used and may even have advantages in some applications, are oil, water and steam. Oil could be used not only as the aspirator control fluid but also to supply additional fuel. There are some occasions when steam is supplied the hearth to stabilize the furnace heat, here steam would be the ideal fluid. Water could be used but here care must be exercised so as not to add excessive amounts of non-combustibles to the slurry. It should now be obvious that the selection of an aspirator fluid depends on the particular application but by no means changes the control system operation.

The present invention thus provides a novel method and apparatus for controlling coal slurry flow. Although only one basic embodiment has been disclosed and described herein, it is expressly understood that various changes and substitutions may be made without departing from the spirit of the invention. Reference should therefore be made to the appended claims for a definition of the limits of the invention.

What I claim as new and desire to secure by Letters Patent of the United States is:

1. Apparatus for controlling the rate of discharge of a coal slurry into the lower hearth section of a blast furnace, comprising in combination, a burner for discharging the coal slurry into the furnace, a pipe for transporting the coal slurry to the burner, an aspirator in said pipe for pumping the slurry through said pipe in accordance with the rate of flow of a fluid discharged into said aspirator, and means for varying the rate of flow of fluid to thereby vary the rate of flow of coal slurry through the pipe.

2. Apparatus as set forth in claim 1 wherein said last named means comprises means for generating a control signal and means for adjusting the rate of flow of fluid in accordance with changes in the magnitude of the control signal.

3. Apparatus as set forth in claim 1 including means for also discharging a blast gas into the lower hearth section and means for maintaining a predetermined difference between the pressure of the blast gas and the pressure of the coal slurry in said pipe upstream of said aspirator.

4. Apparatus as set forth in claim 2 wherein said signal generating means comprises means responsive to the rate of flow of coal slurry through said pipe and the generated signal adjusts the rate of flow of fluid discharged into said aspirator to maintain a constant rate of flow of coal slurry into the lower hearth section.

5. Apparatus as set forth in claim 4 wherein said signal generating means includes means for generating a master control signal for adjusting the rate of flow of coal slurry to the lower hearth section.

References Cited

UNITED STATES PATENTS

| | | | |
|---|---|---|---|
| 2,805,678 | 9/1957 | Panich | 266—29 X |
| 2,830,769 | 4/1958 | Work | 100—7 |
| 3,236,629 | 2/1966 | Agarwal et al. | 266—29 X |
| 3,272,617 | 9/1966 | Fennell | 266—30 X |

J. SPENCER OVERHOLSER, *Primary Examiner.*

E. MAR, *Assistant Examiner.*